Oct. 29, 1963  R. E. WINN  3,108,364
MANUFACTURE OF INFORMATION STORAGE MATRICES
Filed Sept. 27, 1957

INVENTOR
RUSSELL EDWARD WINN
BY
AGENT

United States Patent Office 3,108,364
Patented Oct. 29, 1963

3,108,364
MANUFACTURE OF INFORMATION STORAGE MATRICES
Russell Edward Winn, Goring-by-Sea, England, assignor to North American Philips Company, Inc., New York, N.Y.
Filed Sept. 27, 1957, Ser. No. 686,764
Claims priority, application Great Britain Oct. 3, 1956
8 Claims. (Cl. 29—241)

This invention relates to the manufacture of information storage matrices.

Such matrices usually comprise a plurality of annular magnetic cores of so-called square-loop ferrite material with two or more conductors passing through each core. The cores of the matrices are generally arranged in a number of parallel rows and parallel columns with a wire, a so-called "$x$" wire, passing through the cores of each row, and a wire, a so-called "$y$" wire, passing through the cores of each column. The threading of these wires may be facilitated by arranging the cores, prior to threading, in recesses formed in a pattern in the face of a jig. The form and dimensions of such recesses at the jig face are such that a recess allows the entry of a core only sideways, i.e. in a radial direction with its axis parallel to the jig face, since that is the position required for threading consecutive cores disposed over the jig face. Moreover, the depth of the recesses may be varied according to the depth to which it is desired that the cores should enter, which in turn may depend on the method of threading.

A known method of matrix manufacture involves providing intersecting grooves in the jig face in addition to the core recesses whereby the $x$ and $y$ conductors may be guided during threading through the rows and columns of cores. To assist location of the cores in the recesses, a duct may be provided extending from the bottom of each recess to the other side of the jig for co-operation with vacuum means whereby, on reception of a core by a recess, the corresponding duct is closed by the received core which is thus held in position by the suction force derived from said vacuum means. The suction force may be used in conjunction with shaking or vibration of the jig while covered by a heap or mass of cores, and/or with agitation of such a mass, so as to effect rapid and automatic filling of the pattern of recesses, after which the excess cores can be removed.

Another method of manufacturing matrix core jigs comprises a plurality of identical or interchangeable elements held in juxtaposed relationship, each element having an operative end portion, and all end portions being aligned so as to constitute together the operative face of the jig or the major part thereof while each end portion is so shaped as to form, with adjacent end portions of other elements, a desired pattern of recesses disposed in rows and columns and each having such form and dimensions as to allow the entry of one core. A jig so constructed may readily be provided with guide grooves for the wires, which with other methods presents considerable difficulties and additional cost. However, it is still difficult and/or expensive to provide a vacuum duct through the jig at the bottom of each core recess for use in automatic filling as described above.

It is an object of the present invention to provide an improved jig arrangement capable of permitting vacuum filling without providing the aforesaid vacuum ducts through the jig at each recess.

A jig arrangement according to the present invention comprises a jig face formed with a desired pattern of recesses disposed in rows and columns and each having such form and dimensions as to allow the entry of one core or a portion thereof, in combination with a removable cover plate having a pattern of apertures each corresponding to one of said recesses, the arrangement being such that, when in the operative or assembled condition, the jig face and cover plate define between them a space communicating with all the said apertures and with at least one outlet for the application of suction, and the form and dimensions of each plate aperture and/or of its corresponding jig face recess being such as to ensure that any core which enters the aperture becomes located substantially at the predetermined orientation desired for the threading of a conductor.

With normal annular cores, the orientation desired for threading is such as to require the entry of a core only sideways, i.e. in a radial direction with its axis substantially parallel to the jig face. The latter is in fact the position required for threading consecutive cores disposed over the jig face.

Preferably the space between the jig face and cover plate is constituted, or constituted principally, by grooves intersecting the core positions in such manner as to be adapted to act as guides in the threading of matrix conductors. Although such grooves can be formed in the underside of the cover plate, they are preferably formed in the jig face in an "$x$" direction and in a "$y$" direction with each "$x$" groove intersecting each of the "$y$" grooves at a core recess.

Such an arrangement permits the grooves to perform two separate functions. During the operation of filling the jig with cores, the cover plate is in position and suction is applied to the grooves, preferably at their peripheral ends, the grooves thus acting so as to distribute the suction force over the complete jig face. In fact such grooves are in effect closed by the cover plate and thus act as ducts communicating with all the core recesses. In this stage of the manufacture of a matrix, a heap or mass of cores may be laid on the cover plate, the jig assembly being then shaken or vibrated, or the mass of cores agitated, at the same time as suction is applied as aforesaid. This action causes cores to enter the recesses through the apertures in the cover plate and thus automatic filling of the pattern of recesses can be effected after which excess cores can be removed while the cores positioned in the jig face are held therein with or without the assistance of such force. The second function of the grooves arises at the threading stage. "$x$" and "$y$" conductors can be threaded through the rows and columns of cores with the assistance of the grooves, each core being located with its aperture astride the intersection between an "$x$" groove and a "$y$" groove. During such threading operation the cover plate may or may not be left in position as desired. In any event, said plate need only be removable to the extent of releasing a threaded matrix, and it may for example be sufficient for the plate to be hinged to the jig face.

The core recesses in the jig face need not be very accurately formed to ensure correct entry of a core, provided that the corresponding aperture in the cover plate is accurately formed in this respect. On the other hand, both jig face and cover plate may have their corresponding apertures and recesses formed with accuracy and good registration by the following method. First the jig face is formed with the desired accuracy. Then it is covered with a compound suitable to act as a resist in an etching process. The jig face is then used in the manner of a printing block to impress upon a thin sheet of metal, for example copper, a resist pattern corresponding to the recesses and guide grooves. The exposed parts of the sheet corresponding to the guide grooves are then covered, e.g. by hand, so as to leave exposed only the outlines of the core recesses. The metal sheet is then formed into the cover plate by etching it right through so that apertures are formed which correspond accurately to the core recesses of the jig face.

This process is particularly advantageous since the cover plate may, if desired, be extremely thin, e.g. a few thousandths of an inch. In fact flexibility is no disadvantage since it permits the plate to be drawn towards the jig face so as to contact the latter effectively and close the grooves when vacuum is applied to the ends of one or each set of grooves for the filling operation.

Preferably, in practice, the cores used have a cylindrical form with an axial length smaller than the diameter. In this case the profile of the plate aperture required to ensure correct entry of the cores is a generally rectangular profile in which the longer dimension of the rectangle corresponds to the diameter of the core.

The jig may be required for the manufacture of matrices of the kind in which adjacent cores are inclined to each other, e.g. at 90°, or it may be used for producing matrices of the kind in which all cores are orientated in the same direction.

Embodiments of the invention will now be described by way of example with reference to the accompanying diagrammatic drawing in which FIGURES 1a and 1b represent respectively fragmentary plan views of a jig face and a corresponding portion of the cover plate for a matrix in which the cores are inclined to each other at 90°.

Figure 1A:
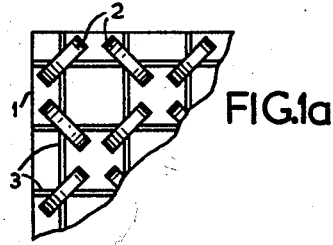
Figure 1B:
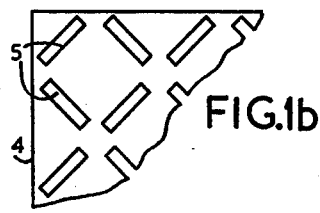

Referring now to FIGURES 1a and 1b, the jig face 1 is provided with core recesses 2 located at the intersections between guide grooves 3. Said recesses have a semicircular base and a depth slightly less than the diameter of a core, the profile of each core recess at the jig face being a rectangle corresponding to the diameter and thickness of a core. The cover plate 4 has a rectangular aperture 5 corresponding to each recess 2.

Figure 2A:
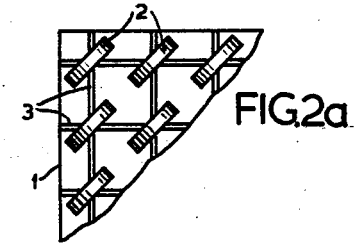
FIGURES 2a and 2b represent similar fragmentary plan views of a jig face and its cover plate for a matrix having cores all orientated in the same direction.
Figure 2B:
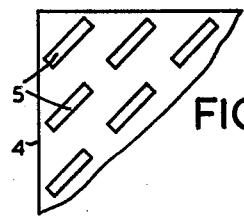

The jig assembly of FIGURES 2a and 2b is similar to that of FIGURES 1a and 1b in all respects except that the core recesses and the corresponding apertures in the cover plate are all orientated in the same direction.

Figure 3:
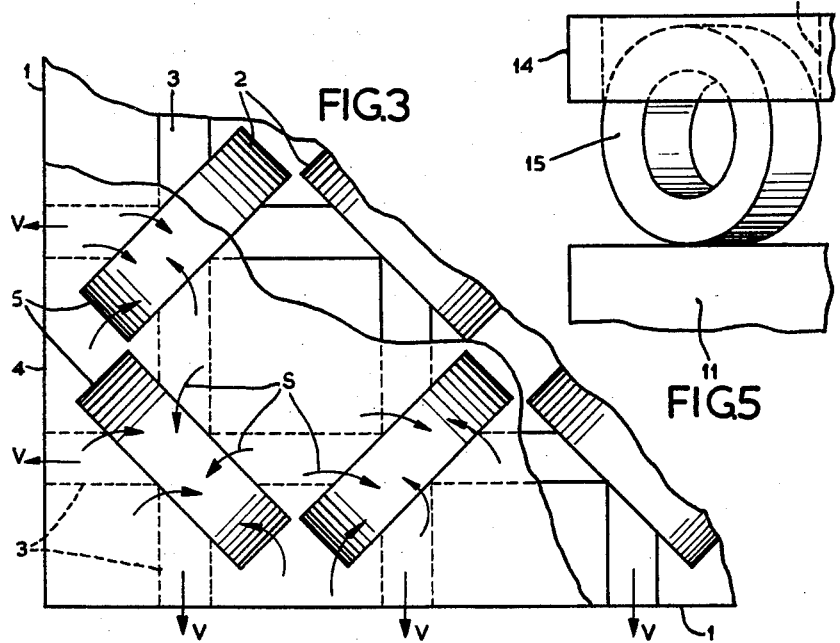
FIGURE 3 is an enlarged plan view of a portion of a jig face similar to that of FIGURE 1a with its cover plate partially broken away.
Figure 4:
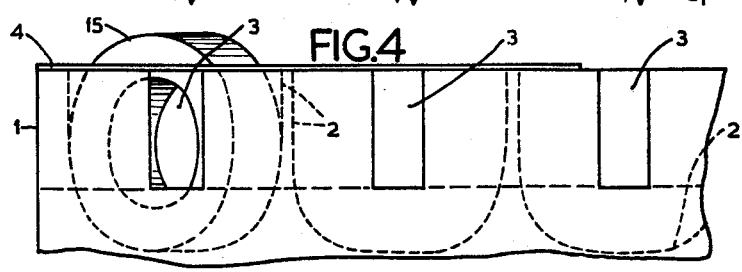
FIGURE 4 is a fragmentary elevation of the assembly of FIGURE 3 showing one core in position in its recess.

FIGURES 3 and 4 are enlarged views of an arrangement similar to that of FIGURES 1a and 1b and illustrate the operation of the assembly. Referring more particularly to FIGURE 3, during the filling operation suction is applied peripherally to the ends of the guide grooves 3 via a manifold (not shown) as is indicated by the arrows V. Since the cover plate 4 covers all the grooves, the latter act as suction distributing ducts communicating with all the apertures 5 in the cover plate. Thus suction is operative at all the apertures 5 as is indicated by the arrows S. This suction action, in conjunction with shaking or agitation of a heap or mass of cores laid on the cover plate 4 as aforesaid, can ensure filling of all the recesses 2, or at least the majority thereof, by cores entering sideways via the apertures 5. One core 15 is shown in FIGURE 4 in position in its recess. As will be seen, its aperture can be viewed through the respective groove 3 since it is aligned with said groove as required for threading of an x or y wire. The depth of the core recesses 2 is greater than that of the grooves to facilitate threading and is such that the core projects slightly above the cover plate 4, when in position, for the same reason. The cover plate 4 shown is very thin as compared with the dimensions of the core 15, and such plate is preferably a flexible metal foil.

As will be appreciated, in the arrangement of FIGURES 3–4 suction need not be applied to the ends of all the grooves 3 as indicated by the arrows V since said grooves provide a continuous network. Thus suction may be applied only at the ends of selected grooves or, for example, only at one or each end of every "x" groove or every "y" groove. On the other hand, suction may be applied to intermediate portions of the groove and recess pattern via a small number of ducts formed through the jig face at selected points within the pattern, each duct communicating directly with a groove or terminating at a selected core recess.

Although the arrangements described hitherto comprise individual core recesses formed in the jig face, and although the provision of such recesses is preferred, it is possible, in accordance with a modification of the invention, to dispense with such individual recesses.

In such modification, location of the core may be achieved by providing the cover plate with apertures having sides of sufficient depth to hold the core in a position suitable for threading by preventing undue tilting or rolling of the core.

Figure 5:
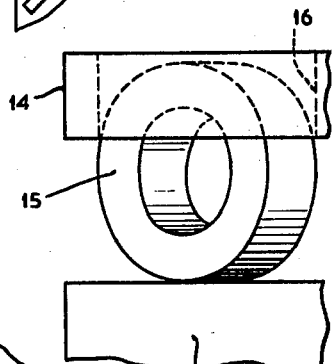
FIGURE 5 is a view similar to that of FIGURE 4 illustrating a modification of the invention.

An example of such a modified arrangement is shown in FIGURE 5. A portion of a plain flat jig face 11 is shown supporting a core 15 which has entered the suction space extending between the jig face and a cover plate 14. The cover plate is relatively thick and has apertures 16 which are formed with substantially parallel sides of sufficient depth to prevent undue tilting of the core due to lateral pressure arising from the threading operation. Actually, in this example a compromise is arrived at in which a part of the aperture in the core is obstructed (which is a loss from the point of view of ease of threading) in order to provide better lateral support of the core against tilting and rolling movements.

Since the cover plate 14 of FIGURE 5 must remain in position during threading, it may in some cases be desirable for it to be transparent to permit viewing of the wires.

In a further variation of the modification of FIG. 5, location of the cores may be effected in part by grooves formed in the jig face with a width slightly greater than the axial dimension of a core. Thus, when a core enters an aperture in the cover plate, it becomes located at least in part (against tilting only) by the respective groove and in part by the cover plate so that a core is supported at spacial points. Location against rolling is provided entirely by the aperture in the cover plate, and for this reason, with cylindrical cores, the cores should only be received to a depth such that their axes remain relatively close to the cover plate. However this variation allows the use of a thin transparent cover plate.

These arrangements may be employed with or without guide grooves to assist threading, which will be understood clearly with reference to FIG. 5. In fact, the core-locating grooves of the jig face according to the above noted variation may be regarded as obtained by connecting the adjacent ends of recesses 2 so as to form an intersecting pattern of locating grooves parallel to the diagonals of the matrix, i.e. the apertures of the cover plate, said grooves having a uniform depth much smaller than that of the recesses 2 shown in FIGURES 3 and 4.

What is claimed is:

1. A jig assembly for manufacturing threaded-core information storage matrices consisting of a plurality of ring shaped core members arranged in a desired pattern of parallel rows, comprising a solid member having a supporting surface containing a plurality of recesses arranged in a complementary pattern and wherein each recess is adapted to receive a magnetic core in upright position with respect to said supporting surface and wherein each of said recesses is intersected by linear grooves, each of which grooves extending through one parallel row of recesses and onto the edges of the member to form ports adapted to be connected to a source of reduced pressure, a removeable cover plate mounted over and connecting said supporting surface and containing a plurality of apertures passing completely therethrough and arranged in registration with the underlying pattern of recesses and forming with said grooves closed channels between said aperture and said ports and effective to cause cores placed at random on the top of said cover plate to be drawn through said apertures and into said recesses upon agitation of said jig.

2. An assembly as defined in claim 1 wherein the cover plate is a thin flexible metal plate.

3. As assembly as defined in claim 1 with the addition of outlet manifold means communicating with the plural grooves to establish a reduced pressure therein when the manifold means are connected to an evacuating device.

4. A jig for manufacturing information storage matrices in which a plurality of core means are operatively associated with conductor means comprising: a jig face member for locating core means in at least one plane, a moveable cover member having a plurality of apertures therethrough in a determined pattern adapted to receive and locate core means in another plane suitable for threading a conductor means in operative relation with aligned core means located by said members, a negative pressure source, and a space between said members adapted to receive the conductor means and communicating each said aperture with said negative pressure source whereby core means placed at random on said cover member are located in a pattern suitable for threading the matrix of core means formed upon vibration and application of negative pressure to said jig.

5. A jig according to claim 4 wherein said jig face member comprises a plate having a plurality of discrete core receiving recesses corresponding with the apertures of said cover member and said space between said members includes a plurality of grooves communicating each said recess with the source of negative pressure and adapted to receive and guide said conductor means through said core means.

6. A jig according to claim 5 wherein said plurality of grooves intersect at said recesses.

7. A jig according to claim 5 wherein said jig face member comprises a plate having said plurality of recesses and one side thereof adjacent said cover member having a plurality of grooves defining said space.

8. A jig according to claim 5 wherein said space between said members comprises a plurality of grooves in at least one of said members.

References Cited in the file of this patent

UNITED STATES PATENTS

| | | |
|---|---|---|
| 627,069 | Baker | June 13, 1899 |
| 661,840 | Baker | Nov. 13, 1900 |
| 682,580 | Widmann | Sept. 10, 1901 |
| 1,857,929 | McFarland | May 10, 1932 |
| 2,226,440 | Parker | Dec. 24, 1940 |
| 2,355,643 | Grover | Aug. 15, 1944 |
| 2,573,087 | Youngblood | Oct. 30, 1951 |
| 2,855,653 | Kastenbein | Oct. 14, 1958 |